United States Patent
Li

(10) Patent No.: US 12,373,031 B2
(45) Date of Patent: Jul. 29, 2025

(54) INFORMATION PROCESSING DEVICE, DISPLAY DEVICE, DISPLAY SYSTEM, AND INFORMATION PROCESSING METHOD

(71) Applicant: CANON KABUSHIKI KAISHA, Tokyo (JP)

(72) Inventor: Wenjing Li, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/637,565

(22) Filed: Apr. 17, 2024

(65) Prior Publication Data

US 2024/0264672 A1 Aug. 8, 2024

Related U.S. Application Data

(63) Continuation of application No. PCT/JP2022/029576, filed on Aug. 2, 2022.

(30) Foreign Application Priority Data

Oct. 18, 2021 (JP) .................... 2021-170235

(51) Int. Cl.
*G06F 3/01* (2006.01)

(52) U.S. Cl.
CPC ............. *G06F 3/015* (2013.01); *G06F 3/012* (2013.01)

(58) Field of Classification Search
CPC .......... G06F 3/015; G06F 3/012; G06F 3/011; G06F 3/01; G06F 3/013; G06F 3/0346; G06F 3/04815; G06T 19/00
See application file for complete search history.

(56) References Cited

U.S. PATENT DOCUMENTS

| 9,381,426 B1* | 7/2016 | Hughes ................. H04L 67/06 |
| 12,155,968 B2* | 11/2024 | Kasaba ................. H04L 12/1827 |
| 2016/0134840 A1* | 5/2016 | McCulloch ............ G06V 40/165 |
| | | 348/14.03 |
| 2018/0335930 A1* | 11/2018 | Scapel ................... H04L 51/10 |
| 2019/0325633 A1* | 10/2019 | Miller, IV ............. G06V 40/18 |

FOREIGN PATENT DOCUMENTS

| JP | H09-070030 A | 3/2019 |
| JP | 6727388 B1 | 7/2020 |
| JP | 6892478 B2 | 6/2021 |

OTHER PUBLICATIONS

International Search Report and Written Opinion for International Patent Application No. PCT/JP2022/029576.

* cited by examiner

*Primary Examiner* — Mihir K Rayan
(74) *Attorney, Agent, or Firm* — Venable LLP

(57) ABSTRACT

An information processing device controls a display that displays an image representing a virtual space in accordance with a content and that includes a second avatar associated with a second user. The information processing device switches an action mode between a first mode in which operations performed by the first user are reflected in the first avatar and also operations performed by the second user with respect to the second avatar are reflected in actions of the second avatar, and a second mode in which the operations performed by the first user are reflected in the first avatar and also a particular action is reflected in actions of the second avatar.

19 Claims, 8 Drawing Sheets

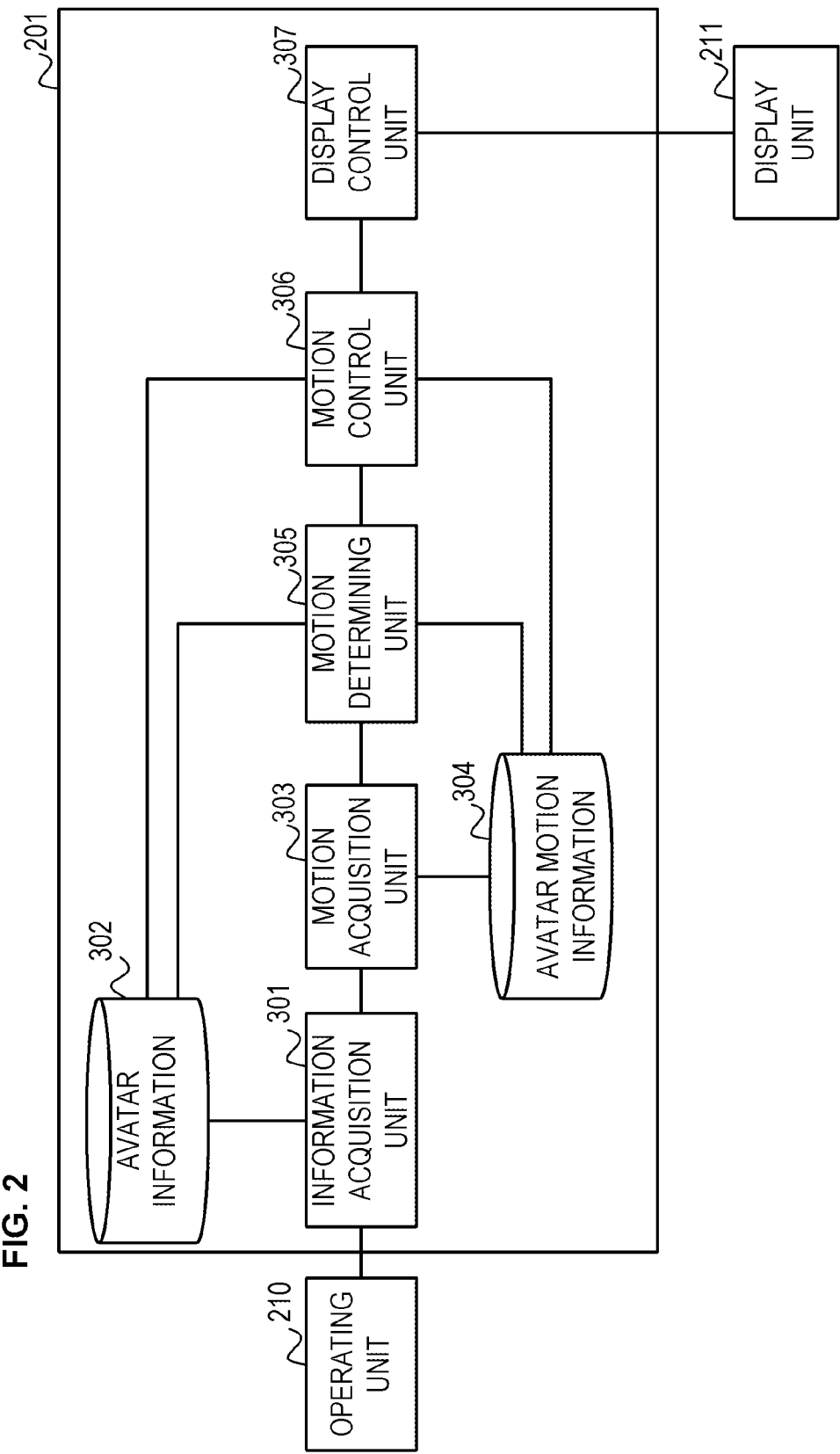

INFORMATION PROCESSING DEVICE, DISPLAY DEVICE, DISPLAY SYSTEM, AND INFORMATION PROCESSING METHOD

CROSS-REFERENCE TO RELATED APPLICATIONS

This application is a Continuation of International Patent Application No. PCT/JP 2022/029576, filed Aug. 2, 2022, which claims the benefit of Japanese Patent Application No. 2021-170235, filed Oct. 18, 2021, both of which are hereby incorporated by reference herein in their entirety.

BACKGROUND OF THE INVENTION

Field of the Invention

The present invention relates to an information processing device, a display device, a display system, and an information processing method.

Background Art

Education and training in environments having real and virtual aspects (augmented reality (AR), mixed reality (MR), and so forth) are becoming widespread. By a user placing an avatar, which is an other self of the user him/herself in virtual space (XR space) and operating the avatar, the user can perform communication and work as if he/she were in the virtual space him/herself. Now, virtual space may be any space of VR (virtual reality), AR (augmented reality), MR (mixed reality) and substitutional reality (SR) space.

PTL 1 describes a system that generates an avatar in virtual space that performs actions that are the movements of a teacher in real space, when holding classes in virtual space. Also, PTL 2 describes a system in which class contents where avatars of a plurality of students are placed in a single virtual space, and hands-on learning contents, in which avatars of a plurality of students are each placed in individual virtual spaces, are displayed being switched therebetween at predetermined timings.

Now, in a case in which avatars of a plurality of users are placed in a virtual space, the plurality of users can each freely operate actions of their own avatars. Accordingly, there is a possibility that an impression that a user viewing the virtual space receives from the virtual space will be disconnected from an impression assumed from real space. To deal with this, an arrangement is conceivable in which each of the users viewing the virtual space finely operates their avatars under a certain level of management, in order to impart impressions on the users close to those of real space, from virtual space. However, this would require strict management, and is not realistic.

CITATION LIST

Patent Literature

PTL 1 Japanese Patent No. 6892478
PTL 2 Japanese Patent No. 6727388

SUMMARY OF THE INVENTION

Accordingly, it is an object of the present invention to provide a technology that easily imparts impressions on users close to those of real space from a virtual space, in a case of placing avatars of a plurality of users in the virtual space.

An aspect of the present invention is an information processing device, including at least one processor capable of causing the information processing device to: accept operations performed by a first user with respect to a first avatar; control a display to display an image representing a virtual space in accordance with a content, the virtual space including a second avatar associated with a second user; switch an action mode between a plurality of modes; and control actions of the second avatar on a basis of the action mode, wherein the plurality of modes include a first mode in which the operations performed by the first user are reflected in the first avatar and also operations performed by the second user with respect to the second avatar are reflected in actions of the second avatar, and a second mode in which the operations performed by the first user are reflected in the first avatar and also a particular action is reflected in the actions of the second avatar, and in a case where the second user performs operations with respect to the second avatar, in the second mode, the operations performed by the second user are not reflected in the actions of the second avatar, and the particular action is reflected in the actions of the second avatar.

An aspect of the present invention is a display system that has a display device having a display, and an information processing device that controls the display device, the display system including at least one processor capable of causing the display system to: accept operations performed by a first user with respect to a first avatar; control the display to display an image representing a virtual space in accordance with a content, the virtual space including a second avatar associated with a second user; switch an action mode between a plurality of modes; and control actions of the second avatar on a basis of the action mode, wherein the plurality of modes include a first mode in which the operations performed by the first user are reflected in the first avatar and also operations performed by the second user with respect to the second avatar are reflected in the actions of the second avatar, and a second mode in which the operations performed by the first user are reflected in the first avatar and also a particular action is reflected in the actions of the second avatar, and in a case where the second user performs operations with respect to the second avatar, in the second mode, the operations performed by the second user are not reflected in the actions of the second avatar, and the particular action is reflected in the actions of the second avatar.

An aspect of the present invention is an information processing method, including: accepting operations performed by a first user with respect to a first avatar; controlling a display that displays an image representing a virtual space in accordance with a content, the virtual space including a second avatar associated with a second user; switching an action mode between a plurality of modes; and controlling actions of the second avatar on a basis of the action mode, wherein the plurality of modes include a first mode in which the operations performed by the first user are reflected in the first avatar and also operations performed by the second user with respect to the second avatar are reflected in the actions of the second avatar, and a second mode in which the operations performed by the first user are reflected in the first avatar and also a particular action is reflected in actions of the second avatar, and in a case where the second user performs operations with respect to the second avatar, in the second mode, the operations performed by the second user are not reflected in the actions of the second avatar, and the particular action is reflected in the actions of the second avatar.

Further features of the present invention will become apparent from the following description of exemplary embodiments with reference to the attached drawings.

BRIEF DESCRIPTION OF THE DRAWINGS

FIG. 2 is a diagram for describing components of the information processing device according to the first embodiment.

DESCRIPTION OF THE EMBODIMENTS

Embodiments according to the present invention will be described below with reference to the drawings. The following embodiments do not limit the present invention, and also, not all combinations of features described in the present embodiment are necessarily essential to the solving means of the present invention. The configuration of the embodiments can be corrected or modified as appropriate depending on specifications of the device to which the present invention is applied, and various types of conditions (usage conditions, usage environment, and so forth). Also, a part of each embodiment described later may be combined as appropriate to obtain a configuration. In the following embodiments, configurations that are the same are denoted with the same signs in the description.

First Embodiment

Figure 1:
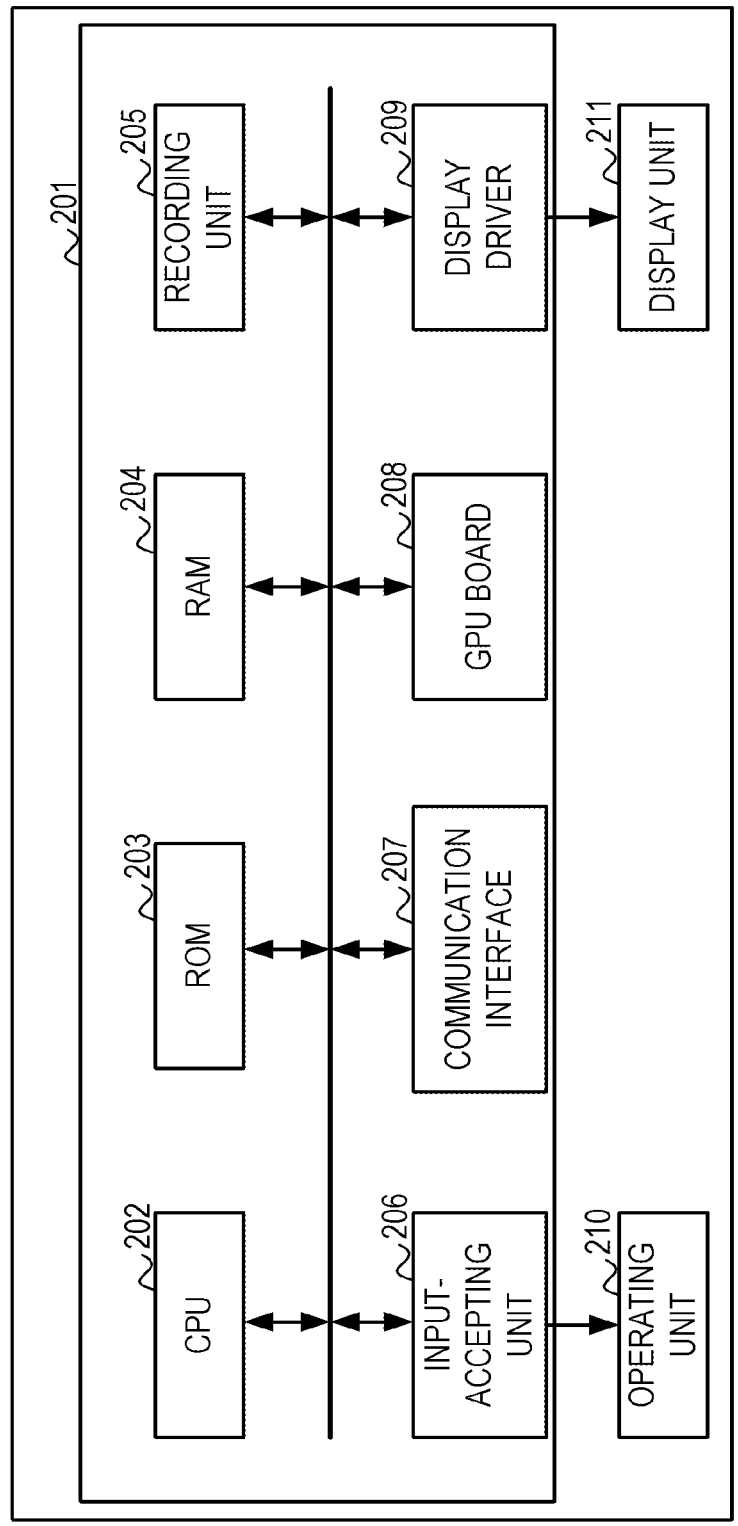
FIG. 1 is a diagram illustrating a system configuration example of an information processing device according to a first embodiment.

FIG. 1 is a configuration diagram illustrating a system configuration example of an information processing device 201 according to a first embodiment. FIG. 2 is a configuration diagram illustrating components for the information processing device 201 to control actions of avatars in a virtual space (XR space).

(Regarding Actions of Avatars)

First, as a premise for describing the configuration of the information processing device 201, actions of a plurality of avatars placed in virtual space will be described with reference to FIG. 3A to FIG. 5.

Here, a case will be described in which images, representing part of a virtual space in which avatars of the plurality of users are placed, are displayed on HMDs (head-mounted displays), as an example. Note that the users view the image representing the virtual space that is displayed at the HMDs, and thereby take classes in an atmosphere close to that of real space. Hereinafter, users viewing images representing the virtual space will be referred to as "viewers".

Figure 3B:
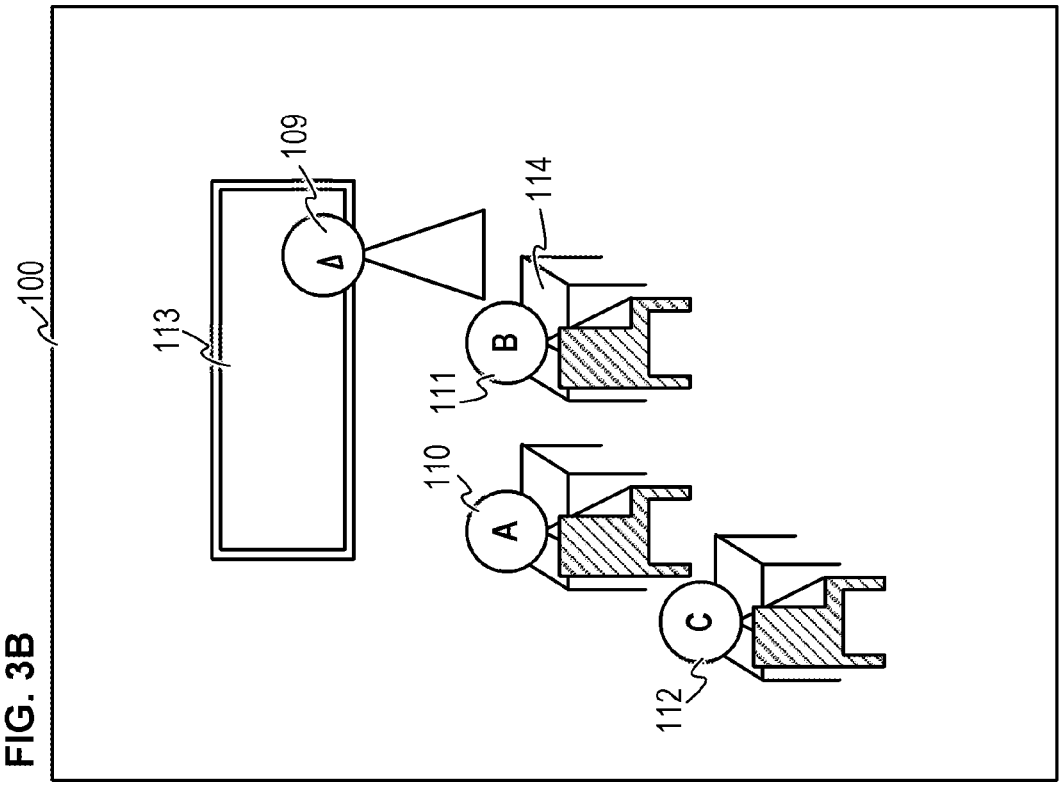
FIG. 3B is a diagram for describing virtual space.
Figure 3A:
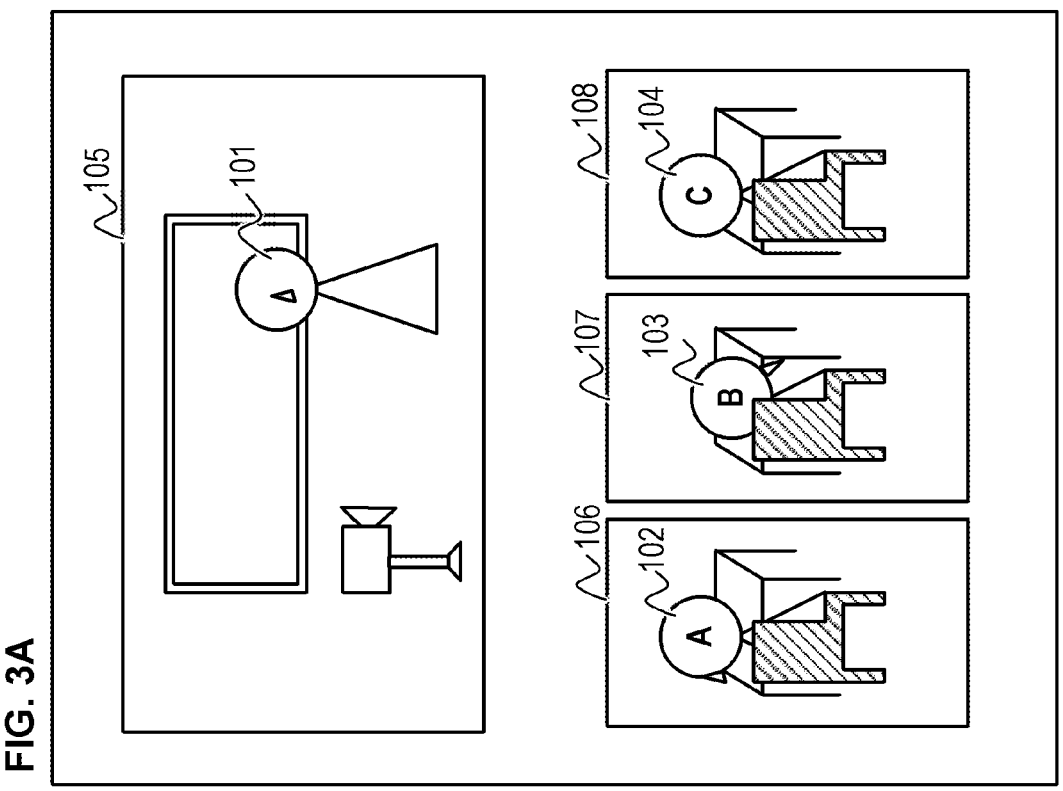
FIG. 3A is a diagram for describing real space.

FIG. 3A is a diagram representing a real space 105 in which a user 101 is present, a real space 106 in which a user 102 is present, a real space 107 in which a user 103 is present, and a real space 108 in which a user 104 is present. The users 101 to 104 are each wearing HMDs. The HMDs that the users 101 to 104 are wearing are each equipped with an image-capturing device (camera) that performs image-capturing (shooting) of real space. Also, the real spaces 105 to 108 are spaces that are far away from each other, such as the homes of the users 101 to 104, or the like. In FIG. 3A, the user 101 is teaching class, and the users 102 to 104 are taking the class. The user 102 is facing sideways and not facing forward, the user 103 is face down on a desk, and the user 104 is facing forward.

FIG. 3B is a diagram representing a virtual space 100 in which avatars 109 to 112, which are associated with (correlated with) the users 101 to 104 in the real spaces 105 to 108, and virtual objects 113 and 114, are placed. The virtual object 113 is a blackboard object. The virtual object 114 is a desk object that is given to each avatar.

For example, an image (part of the virtual space 100) in which the avatars 109 to 111 of the other users 101 to 103 and the virtual objects 113 and 114 are superimposed on an image of the real space 108 that is image-captured, is displayed on the HMD of the user 104. That is to say, the users 101 to 104 can see, of the avatars 109 to 112 virtually placed in the virtual space 100, avatars other than themselves, and the virtual objects 113 and 114, using the HMDs.

Now, a motion mode (action mode) is set to each avatar, to control the actions of that avatar. Specifically, one of two motion modes of a real motion mode (first avatar motion mode) and a virtual motion mode (second avatar motion mode) can be set for each avatar.

The real motion mode is a motion mode for reflecting (setting) real actions (real motions) of the user in the avatar in the first embodiment. Note that the real motion mode may be a motion mode that reflects not only real movement of the user in the movement of the avatar, but also reflects operations performed by the user with respect to the avatar (including changing the position and orientation of the user) in the avatar.

The virtual motion mode is a motion mode for reflecting a particular action (virtual motion) in the avatar. Note that the particular action may be an action that is set in advance, or may be a past action of the user or a current action of another user. That is to say, the virtual motion mode is a motion mode in which actions are reflected in the avatar other than actions in accordance with operations performed by the user with respect to the avatar.

Figure 4:
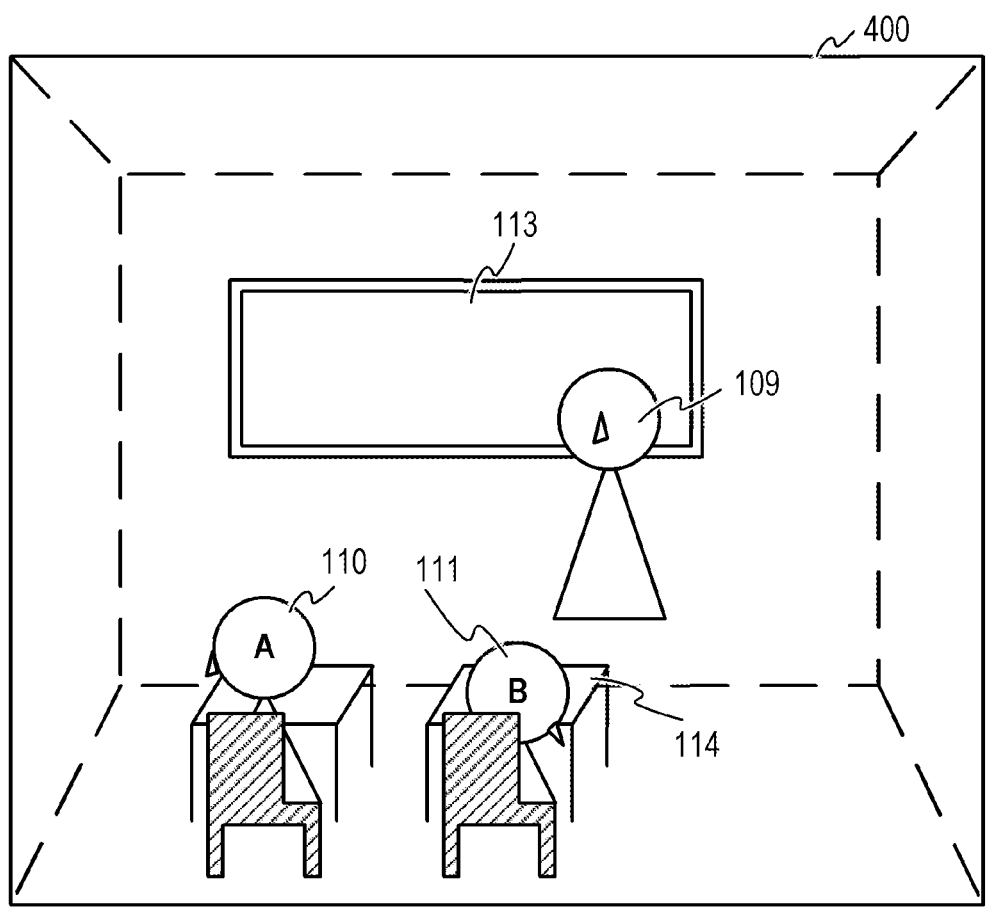
FIG. 4 is a diagram for describing a real motion mode.

For example, in a case in which the real motion mode is set for the avatars 109 to 111, real actions of each of the users 101 to 103 (actions in accordance with change of the position and orientation of each of the users 101 to 103) are reflected in the avatars 109 to 111. FIG. 4 illustrates a virtual space 400 (image) displayed on the HMD of the user 104 in this case. Thus, an image is displayed on the HMD of the user 104 in which the avatars 109 to 111 performing the same actions as the real actions of the other users are superimposed on the image (real image) representing real space that is image-captured (shot) by the image-capturing device (camera) of the HMD.

Figure 5:
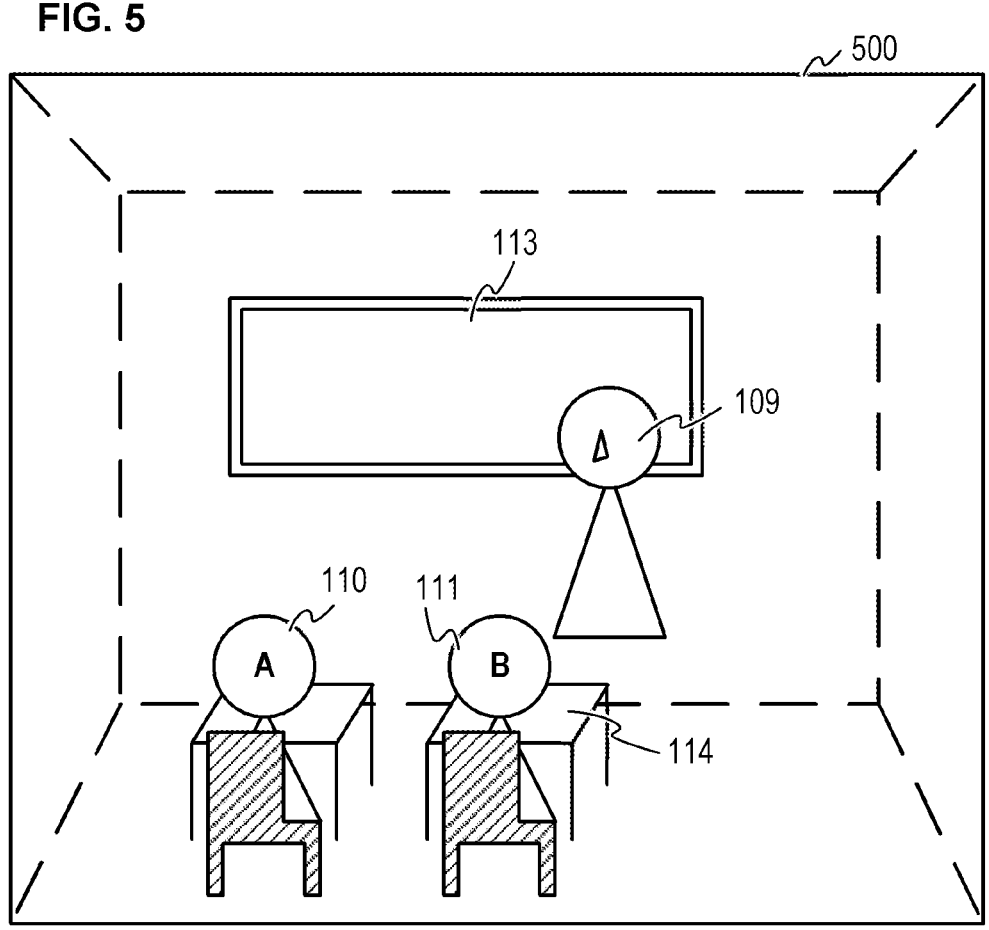
FIG. 5 is a diagram for describing a virtual motion mode.

Also, in a case in which the virtual motion mode is set for the avatars 109 to 111, for example, a particular action (predetermined action) is reflected in the avatars 109 to 111. FIG. 5 illustrates a virtual space 500 (image) displayed on the HMD of the user 104 in this case. The particular action is an action that matches the matter of the contents (e.g., action of taking notes in a notebook of what is being taught in the class, action of continuing to face forward, or action of periodically nodding). Thus, the avatars 109 to 111 of the other users, performing actions suitable for the matter of the contents, are displayed on the HMD of the user 104.

Note that in a case in which the virtual motion mode is set to the avatars 109 to 111 not only is an image representing the virtual space displayed, but also audio corresponding to the situation of progress of the contents (audio set in advance) may be played at the same time. For example, in a situation in which the situation of progress of the contents is during a class, the audio corresponding to the situation of progress of the contents would be sound of writing text in a notebook, sound of a chime that is sounded at a predetermined time, and so forth.

(Regarding Configuration of Information Processing Device)

FIG. 1 is a diagram illustrating a system configuration of the information processing device 201. The information processing device 201 generates, for example, a virtual space (MR space) in which virtual objects are superimposed on an image representing real space that is image-captured (shot) by the image-capturing device (camera) that the HMD of the user 104 is equipped with. The information processing device 201 then transmits the image that is generated to the HMD. The virtual object is generated using computer graphics (CG) technology. Note that detailed description regarding MR technology will be omitted in the present specification, since MR technology is already-existing technology.

The information processing device 201 has, as the system configuration thereof, a CPU 202, ROM 203, RAM 204, a recording unit 205, an input-accepting unit 206, a communication interface 207, a GPU board 208, and a display driver 209. The information processing device 201 may be any electronic equipment such as a PC, smartphone, tablet terminal, or the like, as long as it is capable of information processing.

The CPU 202 is a system control unit. The CPU 202 controls the entire information processing device. The CPU 202 also realizes processing of the flowcharts in FIG. 6 and FIG. 7 according to the first embodiment, by executing an information processing program.

The ROM 203 is read-only memory that stores programs (basic programs) and parameters that do not require changing. The RAM 204 is memory that temporarily stores input information, computation results (computation results from information processing and image processing), and so forth.

The recording unit 205 is a device that is capable of writing and reading various types of information. The recording unit 205 is a device (hard disk or memory card) that is built into or externally attached to the information processing device 201. The recording unit 205 may be a device that is detachably attachable to the information processing device 201 (memory card, flexible disk, or IC card).

The information processing program is recorded in the recording unit 205. The information processing program is read out from the recording unit 205 and loaded to the RAM 204, and executed by the CPU 202. Note that the information processing program may be stored in the ROM 203. Operation information input at the input-accepting unit 206, and information of the position and orientation of the users 101 to 104 detected by the HMDs can also be recorded in the recording unit 205. Information of particular actions, which are actions of avatars in the virtual motion mode, may also be recorded in the recording unit 205.

The input-accepting unit 206 accepts operation information in accordance with operations performed by the users, from an operating unit 210.

The communication interface 207 is an interface that is capable of exchanging data with external devices (operating devices, the cloud, and so forth). In the present embodiment, the communication interface 207 can accept, via a network, information of images representing real space that are image-captured by cameras that the HMDs of the users 101 to 104 are equipped with, information of position and orientation detected by the HMDs of the users 101 to 104, and so forth.

Note that the users 101 to 104 can control the actions of the avatars by changing their own positions and orientations. Accordingly, information of the position and orientation of a user can also be said to be operation information (information of operations performed by the user). Thus, the input-accepting unit 206 and the communication interface 207 together can also be understood as being an "operation accepting unit" that accepts operations performed by the users.

The GPU board 208 performs processing such as generating and compositing images, and so forth. The GPU board 208 is a general-purpose graphics board. The GPU board 208 can perform processing of superimposing images of virtual objects on images representing real space image-captured by a camera of an HMD (image generating and compositing processing). Images of the virtual object are generated in advance, for example, and recorded in the recording unit 205.

The display driver 209 controls a display unit 211. The display driver 209 is software.

The operating unit 210 acquires operation information in accordance with operations performed by users. The operating unit 210 include operating devices that are capable pointing operations and inputting various types of commands and so forth (keyboard, mouse, controller, and so forth). In the first embodiment, the operating unit 210 acquires operation information at the time of the users operating their avatars in virtual space. The operation information is sent to the input-accepting unit 206. Note that the operating unit 210 may acquire operation information in accordance with motion capturing.

The display unit 211 is an electronic display device (liquid crystal display device or the like) that each HMD of the users 101 to 104 is equipped with. The display unit 211 displays an image representing virtual space (XR space) generated by the GPU board 208 on the basis of information recorded in the recording unit 205. The display unit 211 displays a region of the virtual space that corresponds to the position and orientation of the user wearing the HMD (operations performed by the user with respect to the avatar).

Note that in FIG. 1, the operating unit 210 and the display unit 211 are expressed as being configurations outside of the information processing device 201. Accordingly, FIG. 1 can be understood as illustrating a display system made up of the information processing device 201, the HMD (display device) having the display unit 211, and an operating member having the operating unit 210. Also, FIG. 1 may be understood as illustrating the configuration of the HMD, and the HMD may have a configuration including the information processing device 201, the operating unit 210, and the display unit 211. The information processing device 201 may include the operating unit 210 and the display unit 211.

FIG. 2 is a configuration illustrating components of the information processing device 201 that control actions of avatars. In the present embodiment, description will be made regarding components of the information processing device 201 that displays images representing virtual space at the HMD of the user 104 illustrated in FIG. 3A. Note that the CPU 202 in FIG. 1 executes the processing of the components illustrated in FIG. 2, and accordingly it can be said that the components illustrated in FIG. 2 are part of the CPU 202. The information processing device 201 has, as the above components, an information acquisition unit 301, a motion acquisition unit 303, a motion determining unit 305, a motion control unit 306, and a display control unit 307.

The information acquisition unit 301 acquires information of the user associated with the avatar in virtual space. In the example in FIG. 3A, the information acquisition unit 301 acquires, from the HMDs that are worn by the users 101 to 104, user ID (login information) and information regarding an avatar operation method (information of operating device). The information acquisition unit 301 then stores the user ID and the information of the avatar operation method in the recording unit 205, for example, as avatar information 302. The information of the avatar operation method is information representing how the user controls the actions of the avatar. Accordingly, the information of the avatar operation method is, for example, information that actions of the avatar are controlled by change in the position and orientation of the user, information that actions of the avatar are controlled by performing operations of a controller, and so forth.

The motion acquisition unit 303 acquires information of the position and orientation (position, direction, and action) of the avatars 109 to 112. The motion acquisition unit 303 stores the information of the position and orientation of the avatars in the recording unit 205, for example, as avatar motion information 304.

The motion determining unit 305 determines the motion mode (action mode) to be set to the avatars 109 to 111. For example, the motion determining unit 305 determines, in accordance with operations performed by users for controlling movement of the avatars of each of the avatars 109 to 111, the motion mode for the avatars 109 to 111. Also, in a case of the user 104 instructing the motion mode for each avatar, the motion determining unit 305 determines the motion mode of the avatars in accordance with the instruction by the user 104. Also, the motion determining unit 305 may determine the motion mode of each avatar in accordance with settings associated with the situation of progress of the contents (elapse of time or the like). Note that in a case of the user 104 instructing the motion mode, the user 104 may instruct the motion mode for all of the avatars 109 to 111 in batch fashion, or may individually instruct the motion mode for each of the avatars 109 to 111. Also, instruction of the motion mode to be set to the avatars 109 to 111 displayed on the HMD of the user 104 may be performed by any one of the users 101 to 103, not limited to the user 104. Further, the motion mode to be set to the avatars 109 to 111 may be determined in advance.

The motion control unit 306 reflects the action in accordance with the motion mode determined by the motion determining unit 305 in the actions of the avatars 109 to 111. Specifically, the motion control unit 306 controls actions (performs action control) of the avatars 109 to 111 on the basis of the avatar information 302 and the motion mode.

For example, the motion control unit 306 determines the user associated with the avatar regarding which actions are to be controlled, on the basis of the avatar information 302, and acquires operations performed by the user corresponding to the avatar operation method. In a case in which the motion mode of the avatar regarding which actions are to be controlled is the real motion mode, the motion control unit 306 then reflects in the avatar the operations (actions) performed by the user regarding the avatar.

Conversely, in a case in which the motion mode of a certain avatar is the virtual motion mode, the motion control unit 306 reflects a particular action in this avatar. Note that in a case in which the actions of the certain avatar are to be controlled to the same actions as the actions of the other avatars, the motion control unit 306 may control the actions of the avatars 109 to 111 on the basis of the avatar motion information 304. Also, in a case of reflecting actions of a first user in the avatar 111 as particular actions, for example, the motion control unit 306 can switch to reflect actions of a second user in the avatar 111 as particular actions, on the basis of an instruction from the operating unit 210.

Note that regardless of which motion mode (actions) the motion mode of the avatars 109 to 111 is, the motion control unit 306 always reflects the operations performed by the user 104 (change in position and orientation of the user 104; actions of the user 104) with respect to the avatar 112 associated with the user 104. That is to say, in a case in which the real motion mode is set for the avatar 110, for example, this real motion mode can be said to be a mode in which the operations performed by the user 102 are reflected in the avatar 110 in a state in which the operations performed by the user 104 are reflected in the avatar 112. Also, in a case in which the virtual motion mode is set for the avatar 110, for example, this virtual motion mode can be said to be a mode in which the particular action is reflected in the avatar 110 in a state in which the operations performed by the user 104 are reflected in the avatar 112.

The display control unit 307 generates an image representing virtual space in which the plurality of avatars are placed. Specifically, the display control unit 307 generates an image in which the avatars 109 to 111, in which the actions determined by the motion determining unit 305 are reflected, are superimposed on an image representing real space. The display control unit 307 then transmits the image in which the avatars 109 to 111 are superimposed to the HMD of the user 104. Thus, the avatars 109 to 111 in which the specified actions are respectively reflected are displayed at the HMD of the user 104.

Note that the display control unit 307 places the avatar 112, in which the motion control unit 306 has reflected the actions, in the virtual space as well. However, the HMD of the user 104 only displays a region viewed from a viewpoint of the avatar 112, in which the motion control unit 306 has reflected the actions, out of the virtual space, and accordingly the avatar 112 itself is not displayed at the HMD. Note that by the position and orientation of the user 104 being changed, for example, the region of the virtual space displayed at the HMD changes due to the viewpoint of the avatar 112 changing. Accordingly, the user 104 can confirm that operations with respect to the avatar 112 are being reflected in the avatar 112, by confirming that the region of the virtual space displayed at the HMD changes. Also, the HMD (display unit 211) may display an image representing the virtual space including the avatar 112 in which the motion control unit 306 has reflected the actions (an image as if viewed from a fixed viewpoint), as illustrated in FIG. 3B.

(Display Control Processing)

Figure 6:
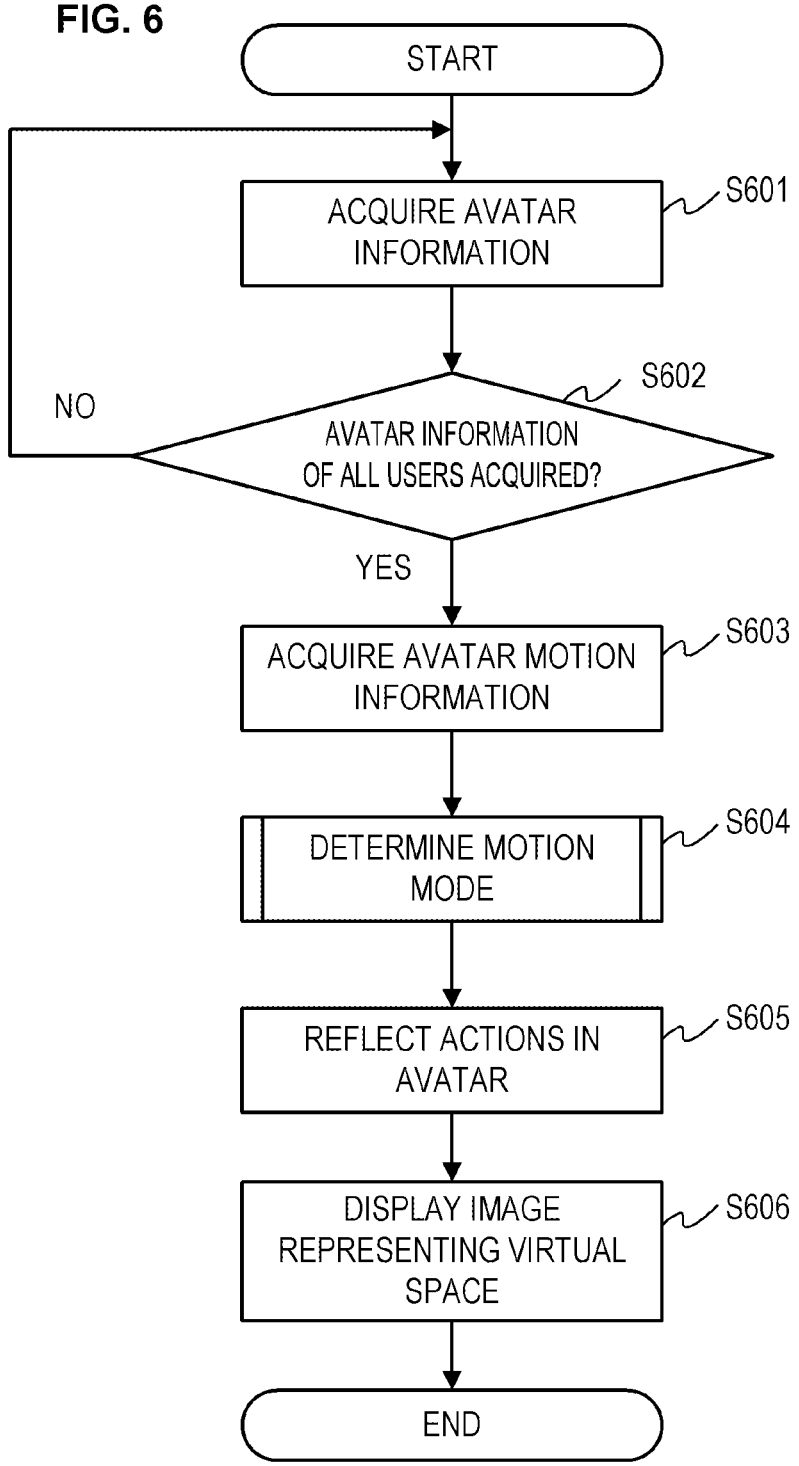
FIG. 6 is a flowchart showing display control processing according to the first embodiment.

Display control processing for controlling the image representing the virtual space displayed at the HMD of the user 104 will be described with reference to the flowchart in FIG. 6. The processing in the flowchart of FIG. 6 is realized by the CPU 202 executing the information processing program recorded in the recording unit 205 and controlling the components. Note that the timing of starting this flowchart is not limited. For example, this may be started at a specified time interval, or may be started at a timing of detecting movement of an avatar.

In step S601, the information acquisition unit 301 acquires the user IDs and the avatar operation method of each of the users 101 to 104, as the avatar information 302. According to the avatar information 302, the users associated with the avatars, and what sort of operations that the actions of the avatars are to be controlled in accordance with, can be identified.

In step S602, the information acquisition unit 301 determines whether or not the avatar information 302 has been acquired for all users 101 to 104 (users corresponding to all avatars in the virtual space). In a case in which the avatar information 302 for all users 101 to 104 has not been acquired, the information acquisition unit 301 then returns the processing to step S601, and acquires the avatar information 302 for users regarding which avatar information is not acquired yet. Conversely, in a case in which acquisition of the avatar information 302 for all users 101 to 104 has been completed, the flow advances to step S603.

In step S603, the motion acquisition unit 303 acquires the positions, the directions, and the actions of the avatars 109 to 112 in the virtual space, as the avatar motion information 304. Now, the user 104 is a viewer in the present embodiment, and accordingly a superimposed image, in which the avatars 109 to 112 and so forth are superimposed on the real space image-captured by the camera of the HMD of the user 104, is recorded in the recording unit 205. The motion acquisition unit 303 reads out the superimposed image from the recording unit 205 to the RAM 204, and acquires information of the positions and orientations of the avatars 109 to 112 in the virtual space that the superimposed image represents.

In step S604, the motion determining unit 305 determines the motion mode of the avatars (avatars 109 to 111) other than the avatar 112 of the user 104. Details of the determination processing of the motion mode will be described later with reference to the flowchart in FIG. 7. Thus, the motion determining unit 305 can switch actions to be reflected in the avatars 109 to 111 by determining the motion mode. That is to say, the motion determining unit 305 can be said to be a switching unit for switching actions (motion mode) to be reflected in the avatars 109 to 111.

In step S605, the motion control unit 306 determines the actions of the avatars 109 to 111 in accordance with the motion mode determined by the motion determining unit 305. The motion control unit 306 then reflects the actions that are determined in the avatars 109 to 111.

In step S606, the display control unit 307 superimposes the avatars 109 to 111, of which the actions have been reflected by the motion control unit 306, on the image representing the real space, along with the virtual objects. The HMD (display unit 211) of the user 104 then displays the image in which the avatars 109 to 111 are superimposed on the image representing the real space, as an image representing virtual space. Note that in a case in which the virtual motion mode is set for all of the avatars 109 to 111, or particular avatars, the CPU 202 may play audio corresponding to the situation of progress of the contents, along with displaying the image.

(Determination Processing of Motion Mode)

Figure 7:
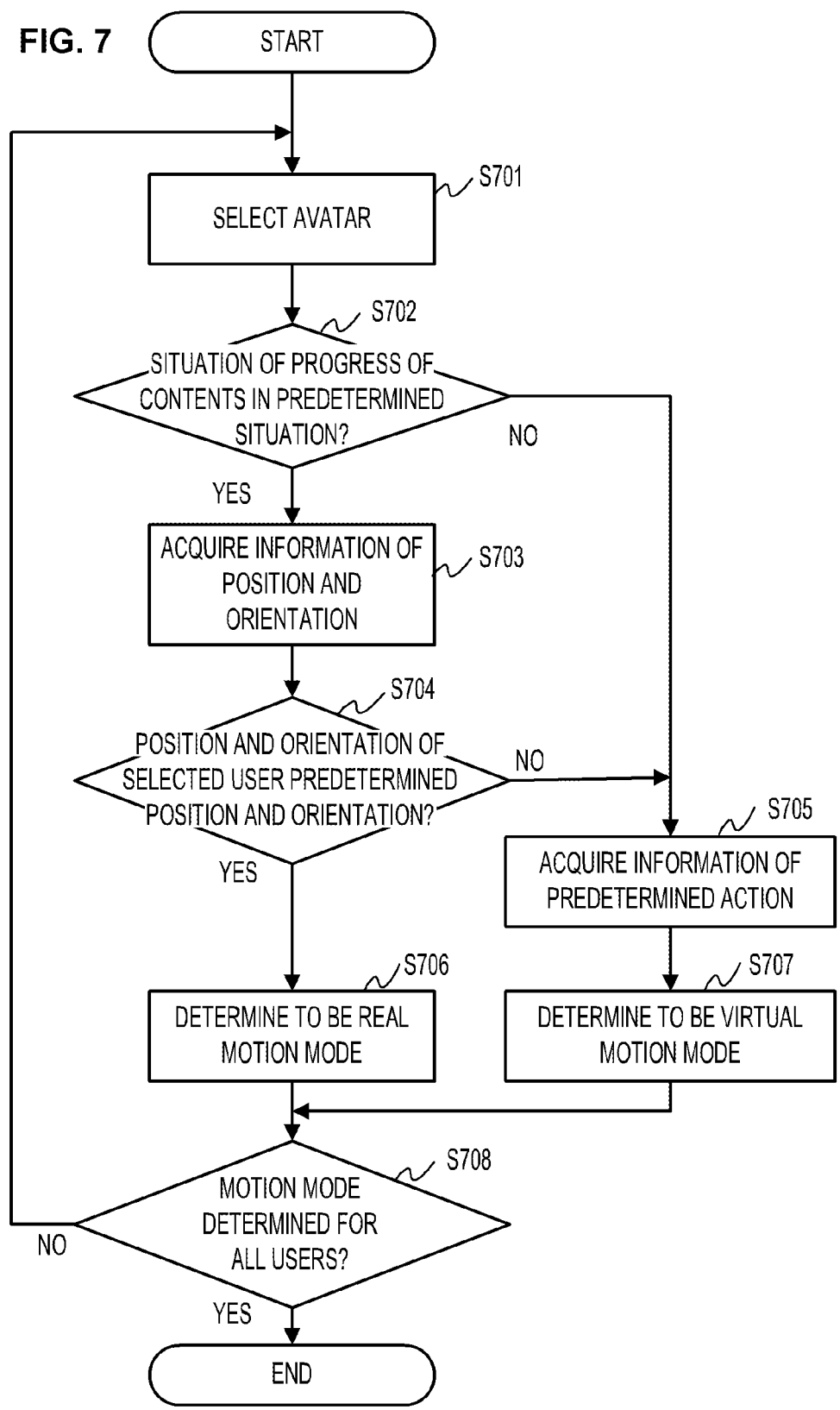
FIG. 7 is a flowchart showing motion mode determination processing according to the first embodiment.

FIG. 7 is a flowchart showing determination processing for the motion mode that the motion determining unit 305 performs in step S604.

In step S701, the motion determining unit 305 selects one avatar out of the avatars 109 to 111 for which the motion mode is to be determined. Hereinafter, the avatar selected in step S701 will be referred to as "selected avatar". Also, the user associated with (corresponding to) the selected avatar will be referred to as "selected user".

In step S702, the motion determining unit 305 determines whether or not the situation of progress of the contents is a predetermined situation. The predetermined situation is a situation such as, for example, before class starts or during recess (i.e., a situation in which necessity to concentrate on the contents is low). In a case in which determination is made that the situation of progress of the contents is the predetermined situation, the flow advances to step S703. Conversely, in a case in which determination is made that the situation of progress of the contents is not the predetermined situation, the flow advances to step S705.

In step S703, the motion determining unit 305 acquires information of the position and orientation of the selected user. Note that information of the orientation and position of the selected user can be determined from the position and orientation (information representing the direction of viewpoint of the user) of the HMD worn by the selected user. Note that the position and orientation of the selected user (HMD) can be optionally changed by the user, and accordingly can be understood as being one of operations performed by the user.

Technology such as, for example, SLAM (Simultaneous Localization and Mapping) or the like can be used as a method for estimating the position and orientation of the HMD. Note that a method other than SLAM may be used, as long as it is a method that can acquire the position and orientation of the user (position and orientation of the HMD) in real space. For example, the position and orientation of the user may be acquired by the HMD being equipped with a gyro sensor, motion capture, or a geomagnetic sensor or the like.

In steps S704 to S707, the motion determining unit 305 determines (switches) the motion mode in accordance with whether or not the position and orientation of the selected user is a predetermined position and orientation (predetermined state).

In step S704, the motion determining unit 305 determines whether or not the position and orientation of the selected user is the predetermined position and orientation. Here, the predetermined position and orientation is, for example, a position and orientation of the selected user in which a particular virtual object (virtual object such as a blackboard or a desk) is displayed (placed) in a direction of line of view of the selected user. Then, in a case in which determination is made that the position and orientation of the selected user is the predetermined position and orientation, the flow advances to step S706. Conversely, in a case in which determination is made that the position and orientation of the selected user is not the predetermined position and orientation, the flow advances to step S705.

For example, there are cases in which the user 101 is teaching a class, but the user 102 loses concentration and looks around the vicinity, as illustrated in FIG. 3A. In this case, reflecting the actions of the user 102 in the real space in the avatar 110 of the user 102 will result in HMD of the user 104 displaying the avatar 110 performing actions that are inappropriate for class (situation of contents). Accordingly, in a case in which the direction of the line of view of the selected user deviates from the particular virtual object, the flow transitions to processing for setting the virtual motion mode to the selected avatar (steps S705, S707).

Note that the predetermined position and orientation may be a position and orientation corresponding to a position of the head of the selected user, instead of the position and orientation corresponding to the direction of line of view of the selected user.

In step S705, the motion determining unit 305 acquires information of predetermined actions from the recording unit 205. The predetermined actions may be actions that are set in advance, or may be past actions of the selected user or current actions of users other than the selected user.

In step S706, the motion determining unit 305 sets the real motion mode to the selected avatar.

In step S707, the motion determining unit 305 sets the virtual motion mode to the selected avatar.

In step S708, the motion determining unit 305 determines whether or not the motion mode has been determined for all avatars 109 to 111. In a case in which determination is made that the motion mode has been determined for all avatars 109 to 111, the processing of this flowchart ends. In a case in which determination is made that there is an avatar regarding which the motion mode has not been determined, the flow returns to step S701.

Note that the motion determining unit 305 can also change the motion mode of the avatars 109 to 111 during a period in which the processing of steps S702 to S707 is being repeated, in response to an instruction (interrupt instruction) from the user 104.

According to the first embodiment, the information processing device 201 changes the actions (motion mode) of the avatars in accordance with the situation of progress of contents corresponding to the virtual space and the position and orientation of the user (operations performed by the user). Accordingly, the viewer can see a virtual space that has an atmosphere close to that of the space.

Note that while the motion mode has been described above as being set to each individual avatar, this may be set with respect to the situation of progress of contents. In this case, when the real motion mode is set with respect to a certain situation of progress of contents, in each of the actions of all avatars 109 to 111 excluding the avatar 112, the actions of the users corresponding thereto out of the users 101 to 103 are reflected. When the virtual motion mode is set with respect to a certain situation of progress of contents, the predetermined action is then reflected in the actions of all avatars 109 to 111 excluding the avatar 112.

Also, biometric information of the user, such as brainwaves, pulse, expressions, and so forth, may be used for determining the motion mode. For example, the motion determining unit 305 determines a degree of concentration of the user 104 with respect to the contents, by an optional known method, in accordance with brainwaves and expressions. In a case in which the degree of concentration is higher than a predetermined value, the motion determining unit 305 then sets the motion mode of the avatars 109 to 111 to the virtual motion mode. Also, in a case in which the degree of concentration is no higher than the predetermined value, the motion determining unit 305 sets the motion mode of the avatars 109 to 111 to the real motion mode. Thus, the user 104 can maintain his/her degree of concentration with respect to the contents at a high level. Conversely, in a case in which the degree of concentration is lower than the predetermined value, the motion determining unit 305 may set the motion mode of the avatars 109 to 111 to the virtual motion mode. In this case, when the degree of concentration is no lower than the predetermined value, the motion determining unit 305 sets the motion mode of the avatars 109 to 111 to the real motion mode. Thus, the user 104 with a low degree of concentration can raise his/her degree of concentration. Accordingly, which of the case in which of the degree of concentration is higher than the predetermined value and the case in which of the degree of concentration is lower than the predetermined value, in which the virtual motion mode is to be set for the motion mode of the avatars 109 to 111, may be determinable by instructions (operations) of the user.

Further, in step S704, the motion determining unit 305 may determine an amount of movement of the selected user during a predetermined period (amount of movement of the position and orientation of the selected user), instead of determining the direction of the line of view of the selected user. In this case, when the amount of movement of the selected user is smaller than a predetermined amount, the flow advances to step S706, and when the amount of movement of the selected user is no smaller than a predetermined amount, the flow advances to step S705. Thus, a situation in which movements of a user who moves a great deal are reflected in the avatar, and interfere with the viewer concentrating on viewing the contents, can be prevented. This enables the viewer to concentrate on viewing the contents.

Second Embodiment

A case has been described in the first embodiment regarding a case in which actions of avatars are controlled on the basis of positions and orientations of users. However, there are cases in which the users control actions of avatars in accordance with operations performed with respect to input equipment such as controllers or the like. In this case, there is a need to determine the motion mode of the avatars regardless of the positions and orientations of the users. Accordingly, an example of a case of users controlling avatars by performing operation of controllers will be described in the present embodiment.

Note that the configuration of the information processing device 201 and the display control processing according to a second embodiment is the same as that according to the first embodiment. Accordingly, only determination processing of the motion mode, which is processing that differs from the processing performed in the first embodiment, will be described below.

Figure 8:
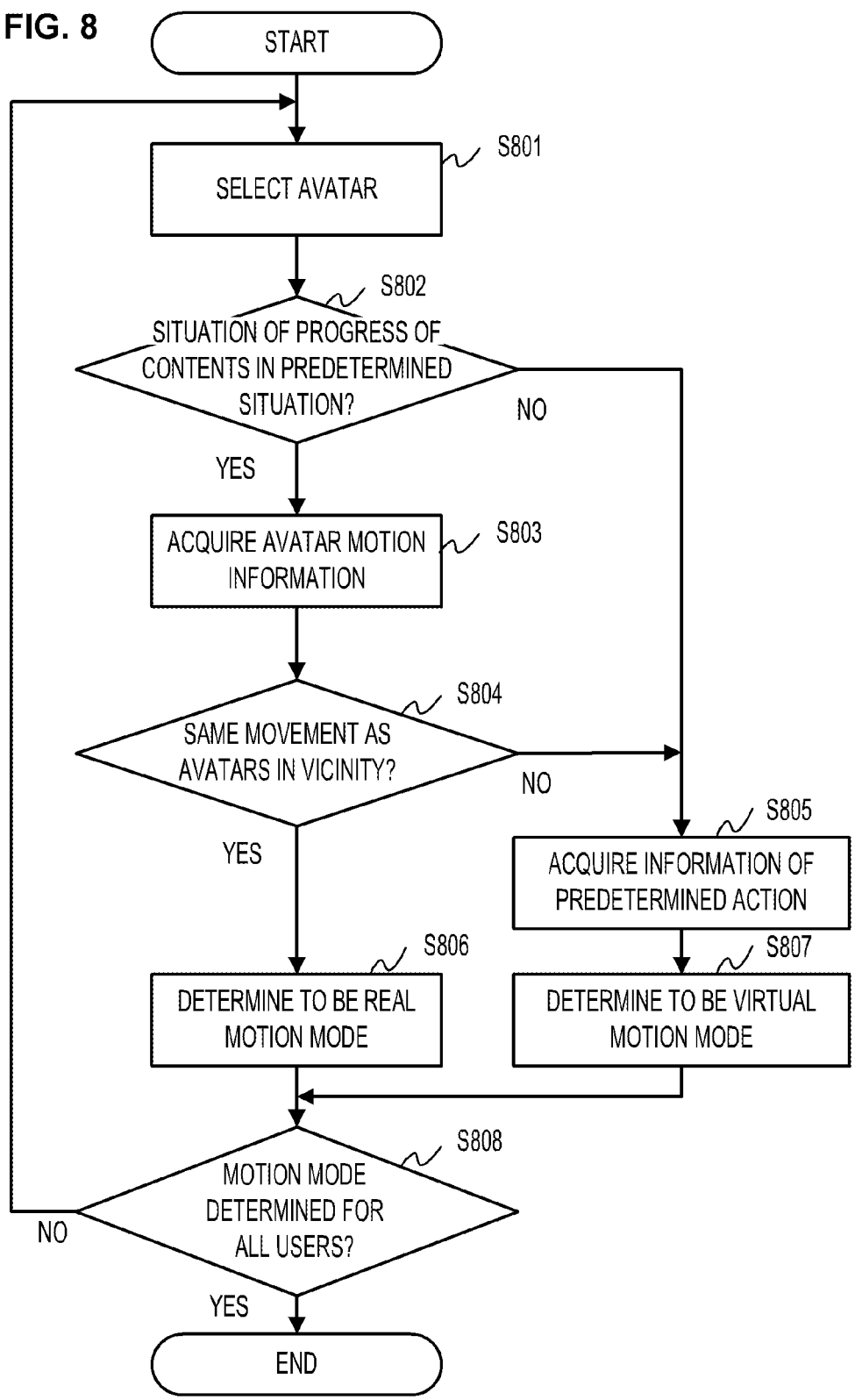
FIG. 8 is a flowchart showing motion mode determination processing according to a second embodiment.

FIG. 8 is a flowchart showing determination processing for the motion mode that the motion determining unit 305 performs in step S604 in FIG. 6 in the second embodiment.

Steps S801 and S802 are the same as steps S701 and S702 in FIG. 7, and accordingly detailed description will be omitted.

In step S803, the motion determining unit 305 acquires actions of the selected avatar that is associated with the selected user from the avatar motion information 304.

In steps S804 to S807, the motion determining unit 305 determines (switches) the motion mode in accordance with whether or not the actions of the selected avatar are the same as actions of avatars in the vicinity. Now, the avatars in the vicinity are, for example, all avatars other than the selected avatar. Also, the avatars in the vicinity may include or may not include the avatar 112 associated with the user 104.

In step S804, the motion determining unit 305 determines the actions of the avatars 109 to 112 on the basis of the avatar motion information 304. The motion determining unit 305 determines whether or not a degree of coincidence of actions of the selected avatar and actions of the avatars in the vicinity (e.g., average of actions of avatars in the vicinity) is no lower than a predetermined threshold value. In a case in which determination is made that the degree of coincidence of actions of the selected avatar and actions of the avatars in the vicinity is no lower than the predetermined threshold value, the flow advances to S806. Conversely, in a case in which determination is made that the degree of coincidence of actions of the selected avatar and actions of the avatars in the vicinity is lower than the predetermined threshold value, the flow advances to S805.

Steps S805 to S808 are the same as steps S705 to S708 in FIG. 7, and accordingly detailed description will be omitted.

As described above, the information processing device 201 according to the first and second embodiments can switch the motion mode of the avatars in accordance with the situation of operations performed by other users. Accordingly, the viewer can perform work in an atmosphere like that of real space, even in a case of a plurality of users working in the virtual space. Also, the information processing device 201 according to the first and second embodiments can switch the motion mode set to each of the avatars to a motion mode that the viewer desires, in accordance with instructions of the viewer.

Although an example has been described in the above embodiments in which a plurality of users each view an image representing virtual space from locations that are away from each other, a plurality of users may gather in a real space and view an image representing virtual space.

Also, an example has been described in the above embodiments in which the users each wear an HMD and view a virtual image in which virtual objects are superimposed on real space. However, the mobile terminal used by the users is not limited to an HMD, and may be a smartphone, tablet terminal, or the like.

Further, in a case in which an image representing virtual space including the avatars 109 to 111 is being displayed at the HMD of the user 104, the user 104 may be enabled to recognize the motion mode set to each of the avatars 109 to 111. For example, the CPU 202 (display control unit 307) may display text in the vicinity of each of the avatars 109 to 111, indicating the motion mode set to the respective avatars, in the image representing the virtual space.

The display control unit 307 may differentiate the display form between avatars to which the real motion mode is set and avatars to which the virtual motion mode is set. For example, the display control unit 307 may perform control to display avatars to which the real motion mode is set in blue, and to display avatars to which the virtual motion mode is set in red. Note that the display control unit 307 may differentiate the shape, size, pattern, motif, or the like, of the avatars, in accordance with the motion mode, and is not limited to differentiation by the color of the avatars.

According to the present invention, impressions close to those of real space can be easily imparted on users from a virtual space, in a case of placing avatars of a plurality of users in the virtual space.

Also, the embodiments described above all exemplarily present the present invention and are not restrictive presentations, and the present invention can be carried out by other various modifications and alterations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not restricted to the above embodiment, and various alterations and modifications can be made without departing from the spirit and scope of the present invention. Accordingly, the following Claims are attached to set forth the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing device, comprising at least one processor capable of causing the information processing device to:
   accept operations performed by a first user with respect to a first avatar;
   control a display to display an image representing a virtual space in accordance with a content, the virtual space including a second avatar associated with a second user;
   switch an action mode between a plurality of modes; and
   control actions of the second avatar on a basis of the action mode, wherein
   the plurality of modes include a first mode in which the operations performed by the first user are reflected in the first avatar and also operations performed by the second user with respect to the second avatar are reflected in actions of the second avatar, and a second mode in which the operations performed by the first user are reflected in the first avatar and also a particular action is reflected in the actions of the second avatar, and
   in a case where the second user performs operations with respect to the second avatar, in the second mode, the operations performed by the second user are not reflected in the actions of the second avatar, and the particular action is reflected in the actions of the second avatar.

2. The information processing device according to claim 1, wherein
   the at least one processor is capable of causing the information processing device to switch the action mode between the plurality of modes on a basis of biometric information of the first user.

3. The information processing device according to claim 2, wherein
the at least one processor is capable of causing the information processing device to
determine a degree of concentration of the first user on the content, on the basis of the biometric information of the first user, and
determine the second mode as the action mode in a case where the degree of concentration is higher than a first value.

4. The information processing device according to claim 2, wherein
the at least one processor is capable of causing the information processing device to
determine a degree of concentration of the first user on the content, on the basis of the biometric information of the first user, and
determine the second mode as the action mode in a case where the degree of concentration is lower than a first value.

5. The information processing device according to claim 2, wherein
the biometric information is brainwaves, pulse, or expressions, of the first user.

6. The information processing device according to claim 1, wherein
the at least one processor is capable of causing the information processing device to switch the action mode between the plurality of modes on a basis of a situation of the content.

7. The information processing device according to claim 2, wherein
the operations performed by the second user are operations in accordance with a position and orientation of the second user, and
the at least one processor is capable of causing the information processing device to determine the second mode as the action mode unless the position and orientation of the second user is a predetermined state.

8. The information processing device according to claim 7, wherein
the predetermined state is a state of the position and orientation of the second user in which a predetermined virtual object is displayed in a direction of a line of view of the second user.

9. The information processing device according to claim 2, wherein
the operations performed by the second user are operations in accordance with a position and orientation of the second user, and
the at least one processor is capable of causing the information processing device to determine the second mode as the action mode in a case where an amount of movement of the position and orientation of the second user is no smaller than a predetermined amount.

10. The information processing device according to claim 2, wherein
the virtual space includes, along with the second avatar, one or a plurality of avatars, and
the at least one processor is capable of causing the information processing device to determine the second mode as the action mode in a case where a degree of coincidence of the actions of the second avatar and actions of the one or plurality of avatars is smaller than a second value.

11. The information processing device according to claim 1, wherein
the particular action is an action of a user other than the second user.

12. The information processing device according to claim 1, wherein
the particular action is a past action of the second user.

13. The information processing device according to claim 1, wherein
the particular action is an action set in advance with respect to the second avatar.

14. The information processing device according to claim 1, wherein
the at least one processor is capable of causing the information processing device to perform control to play audio corresponding to a situation of the content in a case where the action mode is the second mode.

15. The information processing device according to claim 1, wherein
the at least one processor is capable of causing the information processing device to switch the action mode between the first mode and the second mode on a basis of an instruction by the first user or an instruction by the second user.

16. A display device, comprising:
the information processing device according to claim 1; and
the display that displays the image representing the virtual space.

17. A display system that has a display device having a display, and an information processing device that controls the display device, the display system comprising at least one processor capable of causing the display system to:
accept operations performed by a first user with respect to a first avatar;
control the display to display an image representing a virtual space in accordance with a content, the virtual space including a second avatar associated with a second user;
switch an action mode between a plurality of modes; and
control actions of the second avatar on a basis of the action mode, wherein
the plurality of modes include a first mode in which the operations performed by the first user are reflected in the first avatar and also operations performed by the second user with respect to the second avatar are reflected in the actions of the second avatar, and a second mode in which the operations performed by the first user are reflected in the first avatar and also a particular action is reflected in the actions of the second avatar, and
in a case where the second user performs operations with respect to the second avatar, in the second mode, the operations performed by the second user are not reflected in the actions of the second avatar, and the particular action is reflected in the actions of the second avatar.

18. An information processing method, comprising:
accepting operations performed by a first user with respect to a first avatar;
controlling a display that displays an image representing a virtual space in accordance a content, the virtual space including a second avatar associated with a second user;
switching an action mode between a plurality of modes; and
controlling actions of the second avatar on a basis of the action mode, wherein the plurality of modes include a first mode in which the operations performed by the first user are reflected in the first avatar and also operations performed by the second user with respect to the second avatar are reflected in the actions of the second avatar, and a second mode in which the operations performed by the first user are reflected in the first avatar and also a particular action is reflected in actions of the second avatar, and in a case where the second user performs operations with respect to the second avatar, in the second mode, the operations performed by the second user are not reflected in the actions of the second avatar, and the particular action is reflected in the actions of the second avatar.

19. A non-transitory computer readable medium that stores a program, wherein the program causes a computer to execute an information processing method, comprising:

accepting operations performed by a first user with respect to a first avatar;

controlling a display that displays an image representing a virtual space in accordance with contents, the virtual space including a second avatar associated with a second user;

switching an action mode between a plurality of modes; and controlling actions of the second avatar on a basis of the action mode, wherein the plurality of modes include a first mode in which the operations performed by the first user are reflected in the first avatar and also operations performed by the second user with respect to the second avatar are reflected in the actions of the second avatar, and a second mode in which the operations performed by the first user are reflected in the first avatar and also a particular action is reflected in actions of the second avatar, and in a case where the second user performs operations with respect to the second avatar, in the second mode, the operations performed by the second user are not reflected in the actions of the second avatar, and the particular action is reflected in the actions of the second avatar.

* * * * *